United States Patent [19]
Bando

[11] Patent Number: 4,698,088
[45] Date of Patent: Oct. 6, 1987

[54] GLASS PLATE FABRICATION MACHINE UNDER AUTOMATIC CONTROL

[75] Inventor: Shigeru Bando, Tokushima, Japan

[73] Assignee: Bando Kiko Co., Ltd., Tokushima, Japan

[21] Appl. No.: 913,380

[22] Filed: Sep. 30, 1986

[30] Foreign Application Priority Data

Sep. 30, 1985 [JP] Japan .................... 60-218851

[51] Int. Cl.$^4$ ............................................. C03B 33/02
[52] U.S. Cl. ............................................. 65/174; 65/61;
65/97; 65/112; 65/176; 225/93.5; 225/96.5
[58] Field of Search .................. 65/61, 97, 112, 174, 65/176; 225/93.5, 94, 96.5

[56] References Cited

U.S. PATENT DOCUMENTS

| | | | |
|---|---|---|---|
| 2,272,651 | 2/1942 | Waldron et al. | 65/61 X |
| 3,156,390 | 11/1964 | Hess et al. | 225/93.5 X |
| 3,191,857 | 6/1965 | Galey et al. | 65/176 X |
| 3,474,944 | 10/1969 | Chatelain et al. | 65/174 X |
| 3,498,513 | 3/1970 | Bottero | 225/96.5 |
| 3,520,457 | 7/1970 | Augustin | 225/96.5 X |
| 3,754,884 | 8/1973 | McDavid et al. | 65/97 |
| 4,375,738 | 3/1983 | Bando . | |

FOREIGN PATENT DOCUMENTS

| | | | |
|---|---|---|---|
| 2342835 | 4/1975 | Fed. Rep. of Germany | 65/97 |
| 2731230 | 6/1978 | Fed. Rep. of Germany . | |
| 61-30342 | 2/1986 | Japan . | |
| 626596 | 11/1981 | Switzerland . | |

*Primary Examiner*—Arthur Kellogg
*Attorney, Agent, or Firm*—Oblon, Fisher, Spivak, McClelland & Maier

[57] ABSTRACT

A glass plate fabrication machine under automatic control comprises a work table moving linearly along the direction of feeding glass plates, a block moving linearly in the direction in perpendicular to the linear moving direction of the work table, a grinding station disposed to the block by means of a rotating device that rotates around an axis, as the center, vertical to each of the linear moving directions of the work table and the block, a cutting station disposed along with the line in parallel with the linear moving direction of the work table passing through the center of the axis for the rotating device on the block, a glass plate fixing block and a glass plate cutting table disposed on the work table at the positions corresponding to the grinding station and the cutting station respectively, and a cracking station supported on a machine base above the linearly moving work table between the grinding station and the cutting station for raising and cracking the glass plate.

1 Claim, 20 Drawing Figures

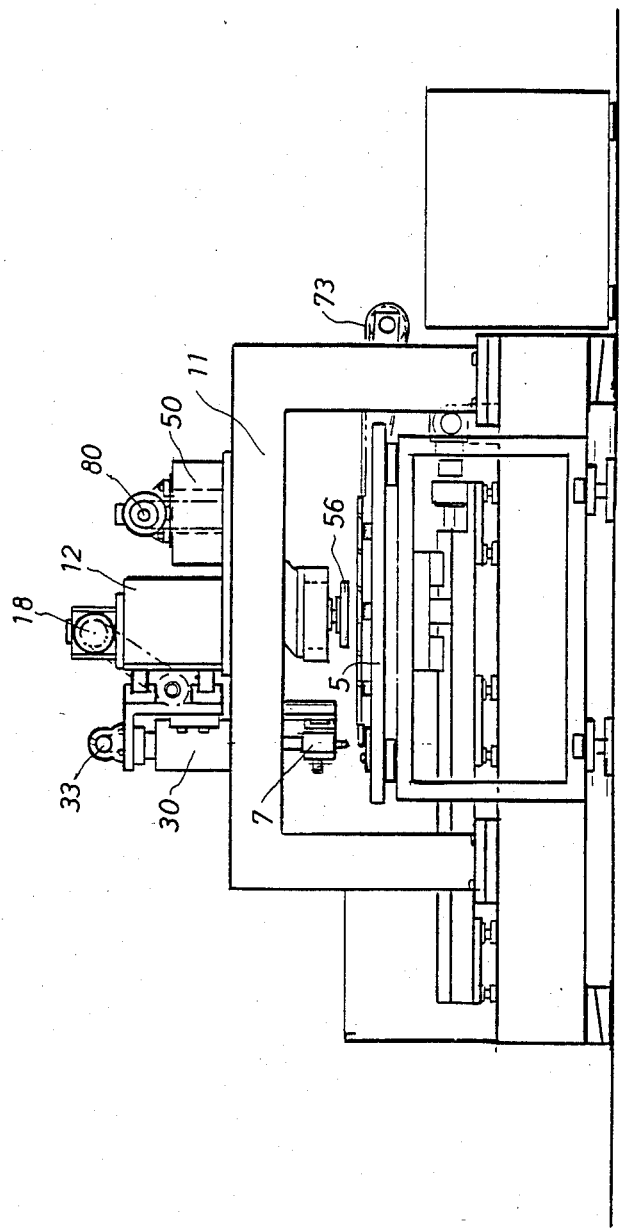

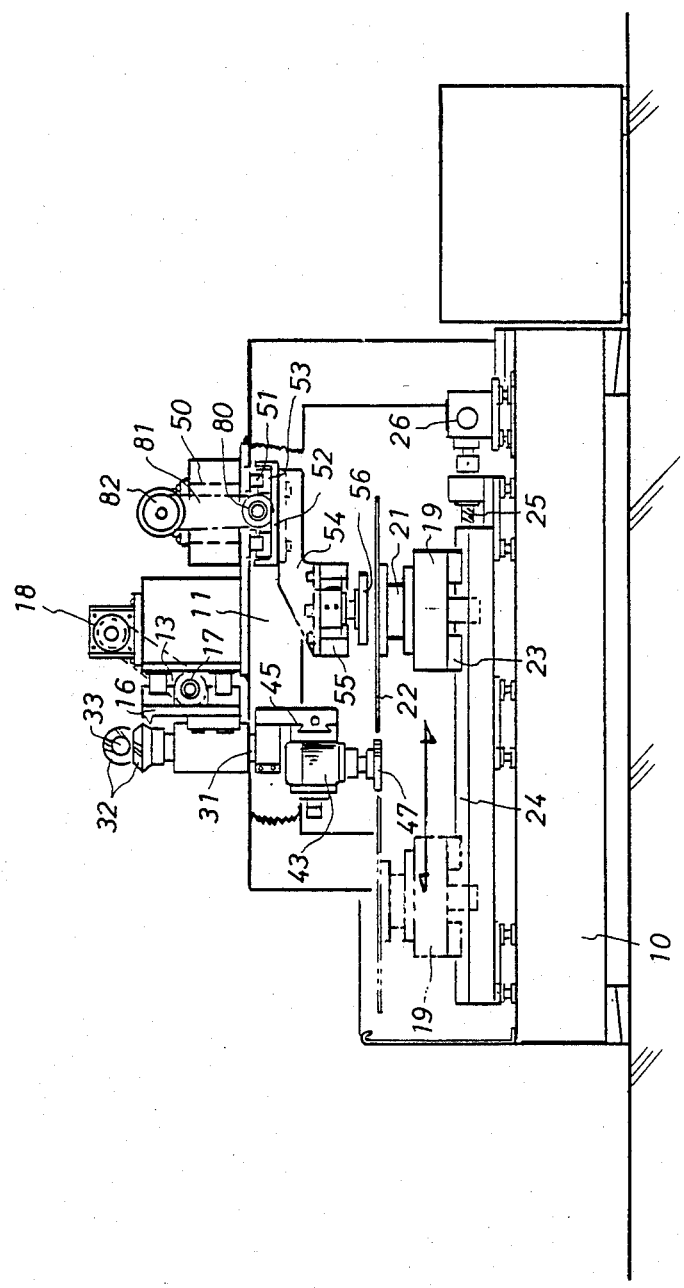

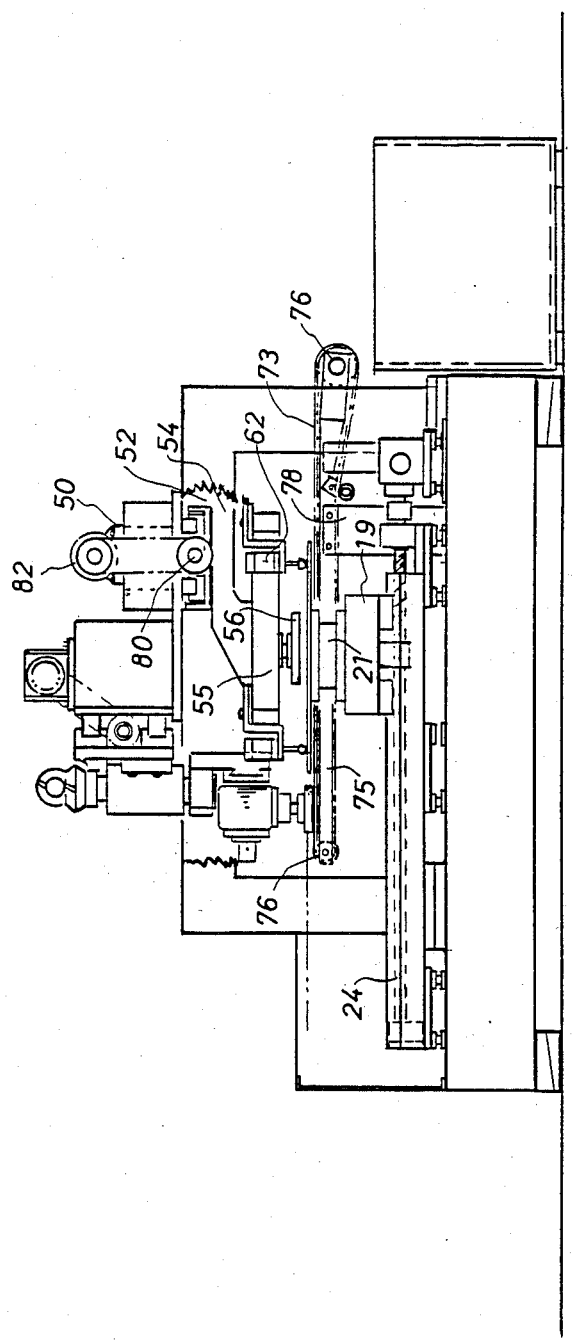

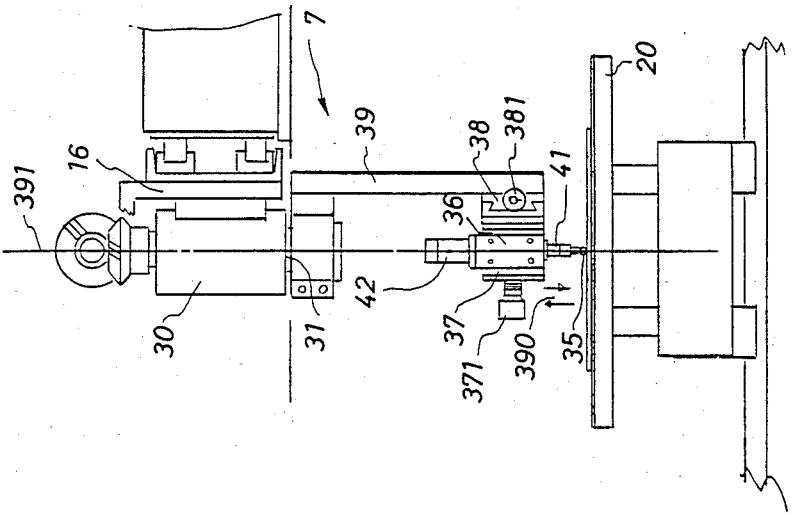
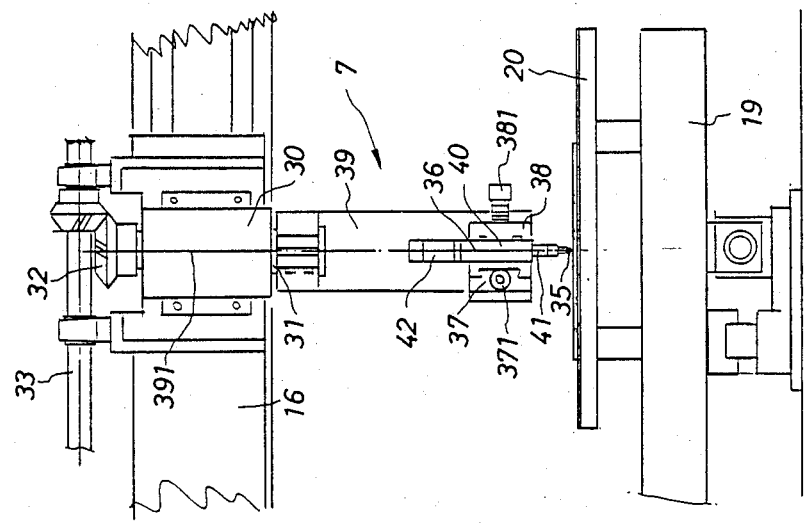

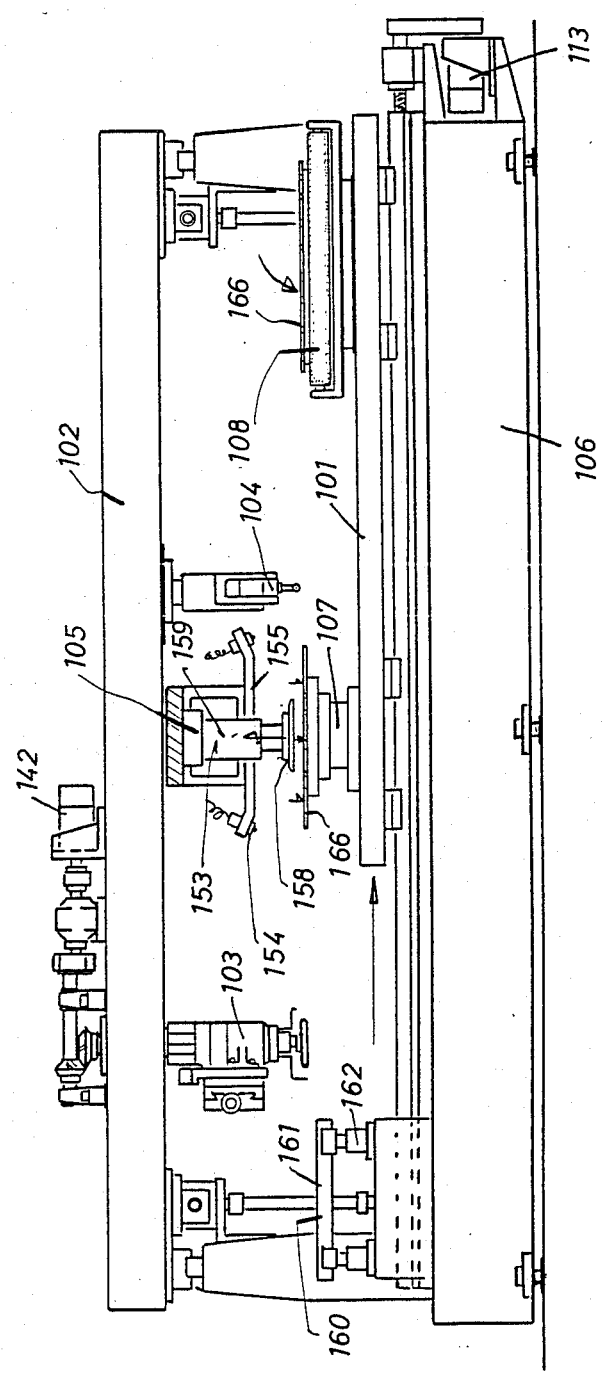

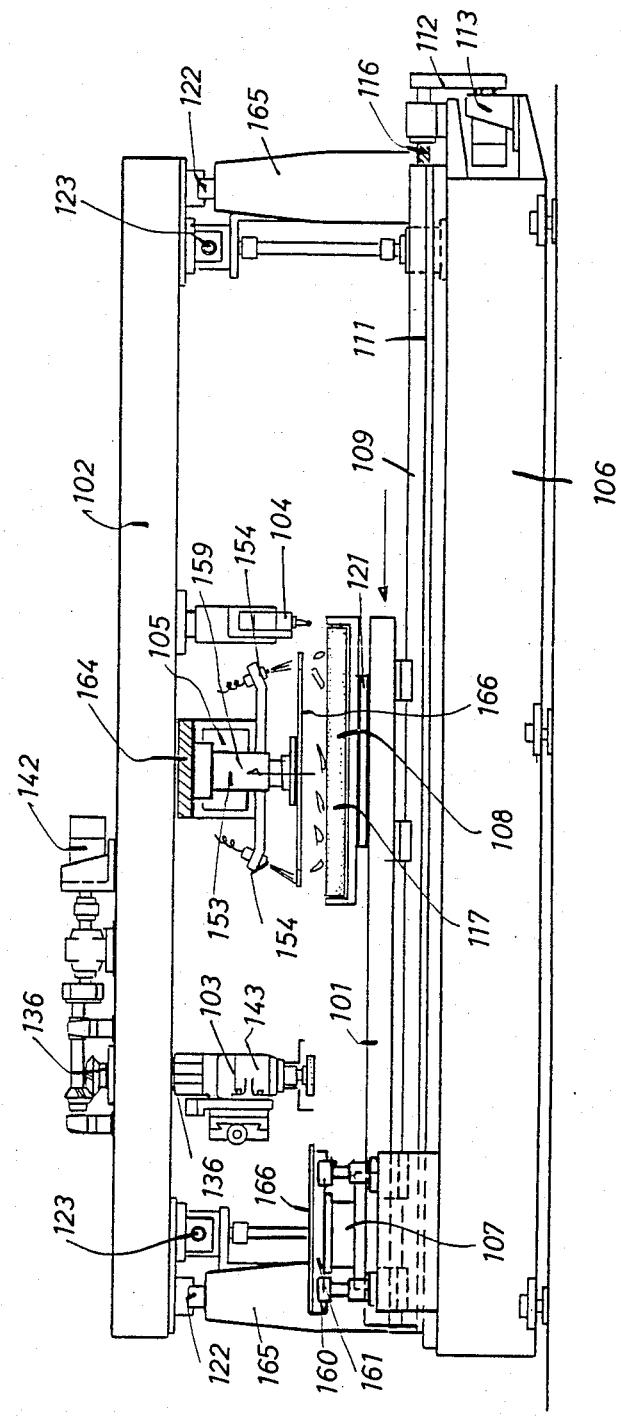

GLASS PLATE FABRICATION MACHINE UNDER AUTOMATIC CONTROL

BACKGROUND OF THE INVENTION

1. Field of the Invention

This invention concerns a glass plate fabrication machine suitable to small lot production for wide variety of articles such as window glass of automobiles, for example, side windows, front windows, rear windows and rear quarters.

2. Description of the Prior Art

The machine is of course applicable to the edge grinding for table top glass articles placed on table and other modified glass plates, not restricted only to glass plates for use in automobile. This invention also relates to a glass plate fabrication machine so adapted that fabrication and transportation of glass plates may be conducted based on numerical control systems.

More specifically, this invention concerns a glass plate fabrication machine capable of carrying out the fabrication including cutting, cracking and grinding finishing of a raw glass plates in a continuous step of flow by means of at least a numerical control device in one machine.

The fabrication machine comprises a cutting station for cutting a raw glass plates based on numerical information, a grinding station for grinding the cut edges of the glass plate, a cracking station disposed between the cutting station and the grinding station for cracking the glass plate finished with cutting (glass plate applied with score-cutting) along with the score-cutting line and a glass conveying station for sequentially transporting glass plates to the cutting, cracking, grinding and further to discharging stations.

In this fabrication machine, the cutting station and the grinding station are connected by means of a common moving mechanism to interlock the operations of the respective stations and, in the course where the cutting and the grinding are conducted in parallel, cracking for the glass plate to be transported to the grinding station at the next operation cycle is carried out in the cracking station.

In the prior art, cutting, cracking and grinding of glass plates have been carried out quite independently from each other by separate devices.

In the automatic line, these devices are connected to a plurality of conveyor devices or glass reversing machines.

In view of the above, the length of the fabrication line is increased and the electrical control system for the automatic operation of the respective devices is complicated.

Particularly, since accurate positioning is required every time the glass plate is supplied to the glass plate cutting device, the cracking device and the grinding device, the structure of each of the devices is complicated. Further, since the fabrication speeds are different from each of the devices, an additional device such as a stocker is necessary for temporarily storing the glass plates. Furthermore, since the fabrication lines are lengthy and complicated, troublesome procedures are required when the kind of glass articles to be fabricated is changed.

This invention has been accomplished for overcoming the foregoing drawbacks in the prior art.

Specifically, it is an object of this invention to provide a glass plate fabrication machine capable of conducting the fabrication of a glass plate from cutting to grinding in one compact machine, so that the working steps including the cutting, grinding, feeding and positioning can be conducted by at least a numerical control device.

It is another object of this invention to provide a glass plate fabrication machine capable of easily coping with the change of kind of glass articles to be worked.

DESCRIPTION OF THE ACCOMPANYING DRAWINGS

This invention will now be described by way of preferred embodiments while referring to the accompanying drawings, wherein:

FIG. 1 is a front elevational view of a fabrication machine according to this invention, FIGS. 2 through 5 are, respectively, partially cutaway plan views of the fabrication machine according to this invention, in which FIG. 4 is a plan view for a glass plate conveying station and FIG. 5 is a plan view for a cracking station, FIG. 6 through 8 are, respectively, a side elevational view and transverse cross sectional view of the fabrication machine according to this invention, FIGS. 9 and 10 are, respectively, side elevational views for the grinding head, FIGS. 11 and 12 are, respectively, side elevational views of the cutting head, FIG. 13 is an enlarged view for the cracking station, FIG. 14 is a partially cutaway front view of another embodiment according to this invention, FIG. 15 is a partially cutaway plan view of another embodiment according to this invention, FIG. 16 is a side elevational view of the grinding head, FIG. 17 is a partially cutaway front view of the cutting head, FIG. 18 through 20 are, respectively, operation explaining view of the fabrication machine of another embodiment according to this invention.

DESCRIPTION OF THE PREFERRED EMBODIMENTS

Figure 1:
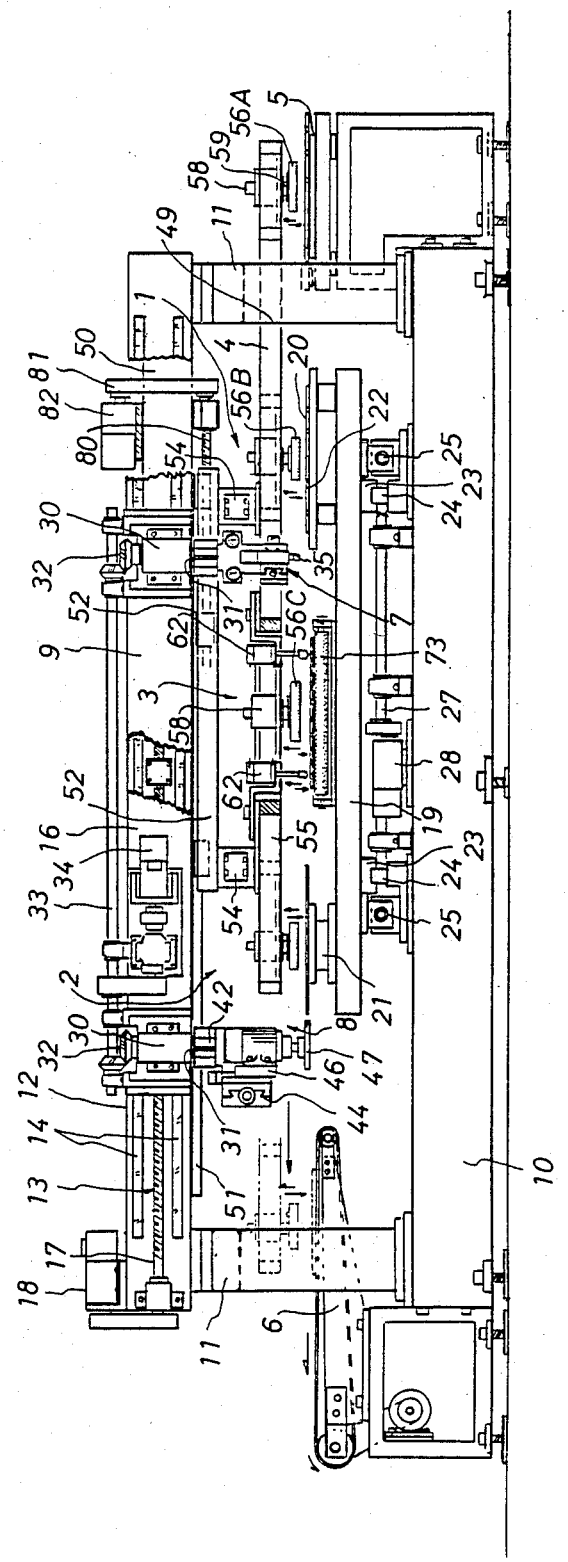
Figure 2:
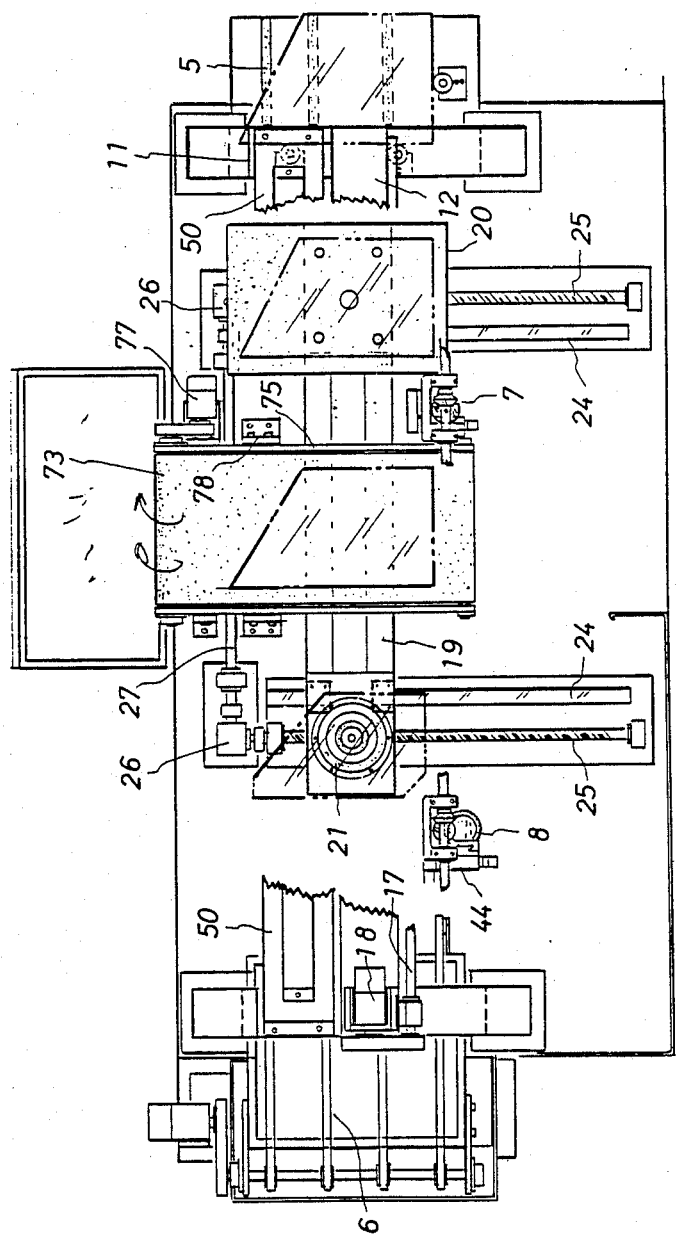
Figure 3:
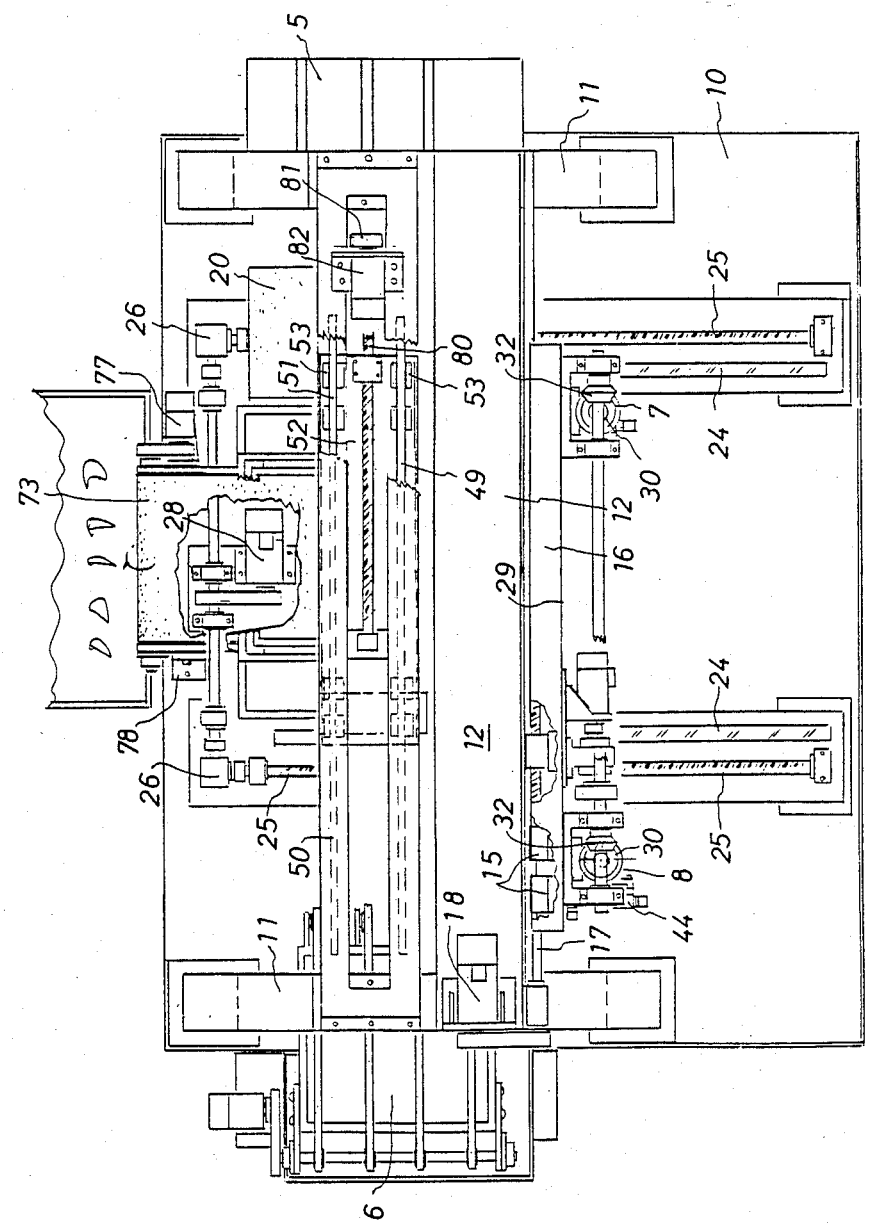

As illustrated in the drawings, the fabrication machine according to this invention comprises a cutting station 1 on the right, a grinding station 2 on the left, a cracking station 3 at the middle and a glass conveying station 4 at the back respectively. Further, a feeder table 5 is disposed ahead of the cutting station 1 and a discharging conveyor 6 is disposed behind the grinding station 2.

A cutting head 7 in the cutting station 1 and a grinding head 8 in the grinding station 2 are connected to common driving means 9 and they perform an identical parallel movement with respect to the coordinate system on an orthogonal plane by means of the common driving means 9 under numerical control.

That is, X-axis and Y-axis of the orthogonal coordinate system are used in common to the cutting head 7 and the grinding head 8.

Now, in the fabrication machine according to this invention, the cutting head 7 and the grinding head 8 are moved along the X-axis, that is, rightward and leftward as viewed from the front of the fabrication machine, while the work table 19 holding a glass plate is moved along the Y-axis, that is, forwardly and rearwardly as viewed from the front of the fabrication machine.

A carriage 12 is disposed above a work table 19 by way of gate type trestles 11 erected on both ends of a machine base 10. Two sets of slide rail devices 13, 13 are disposed in parallel along the direction of X-axis in front of the carriage 12. The slide rail devices 13, 13 comprise a rail main body 14 laid on the carriage 12 and a plurality of slides 15 moving on the rail main body 14, and a linearly moving block 16 is fixed to the slides 15. The cutting head 7 and the grinding head 8 are mounted to the linearly moving block 16. Accordingly, the cutting head 7 and the grinding head 8 are integrally moved being guided by the slide devices 13 and 13 in the direction of X-axis.

The linearly moving block 16 is driven in the direction of X-axis by a feed screw 17 disposed between two sets of the slide rail devices 13 and 13 and an X-axis control motor 18 connected with the feed screw 17. A work table 19 is disposed below the cutting head 7 and the grinding head 8 such that it is moved and guided in the direction of Y-axis.

On the work table 19, a cutting table 20 corresponding to the cutting head 7 and a suction disk 21 corresponding to the grinding head 8 are disposed. The cutting table 20 has such a size of area as supporting the entire plane at the lower surface of a glass plate 22 to be cut. The upper surface of the table 20 is made flat and appended with a sheet so as not to injure the glass plate. While on the other hand, the suction disk 21 is connected by way of pipeways and valves to a vacuum pump (not illustrated) for the vacuum suction of the glass plate.

The work table 19 comprises slides 23 and 23 at both ends thereof in parallel with each other along Y-axis, and the table 19 is supported on the slide rails 24 and 24 by the engagement of the slides 23 and 23 to the slide rails 24 and 24. Since the slide rails 24 and 24 are laid in parallel along Y-axis of the machine base 10, the work table 19 is moved while being guided in the direction of Y-axis.

The driving in the direction of Y-axis is carried out by two sets of feed screws 25 and 25 disposed along the slide rails 24 and 24, gear boxes 26 and 26 for connecting these feed screws 25 and 25, a line shaft 27 and a Y-axis control motor 28 for driving the line shaft by way of belt transmission means.

As illustrated in FIGS. 1, 3 through 6, bearing devices 30 and 30 are disposed at the front 29 of the linear moving device 16 moving in the direction of X-axis corresponding to the suction disk 21 and the cutting table 20 of the work table 19.

Each of the bearing devices 30 and 30 has a shaft 31 retained by the bearings, and the shaft 31 is mounted along the axis in perpendicular to the coordinate system on the X-Y plane. The cutting head 7 and the grinding head 8 are mounted to the shafts 31 and 31 respectively. Accordingly, the rotation of the cutting head 7 and that of the grinding head 8 are controlled about the axis in perpendicular to the X-Y axis coordinate plane upon rotation of the shafts 31.

The cutting head 7 and the grinding head 8 are rotationally driven by bevel gears 32 and 32 attached to the shafts 31 and 31 of the respective bearing devices 30 and 30, a line shaft 33 having, on both ends, another bevel gears 32 and 32 meshed with the bevel gears 32 and 32 and a Z-axis control motor 34 for driving the line shaft 33.

As shown in FIGS. 11 and 12, the cutting head 7 comprises a cutter main body 36 having a cutter wheel 35, a setting slide 37 and a cross slide 38 for adjusting the setting position of the cutter main body 36 in two directions crossing to each other within a horizontal plane and a frame 39 to which the setting slide 37 is attached, and the cutting device is mounted at the upper portion of the frame 39 to the shaft 31 of the bearing device 30.

The setting slide 37 is slidably adjusted by means of a screw 371 in one predetermined direction, while the cross slide 38 is slidably adjusted by means of a screw 381 in another direction crossing the one direction as described above.

As shown in FIG. 12, the cutter main body 36 comprises a main body 40 mounted to the setting slide 37, a piston rod 41 held to the main body 40 vertically movably by way of slide bearings or the likes and an air cylinder 42 disposed to the main body 40 for vertically moving the piston rod 41, and the cutter wheel 35 is attached to the top end of the piston rod 41.

The piston rod 41 is moved vertically along the Z-axis direction and lowered upon cutting a glass plate to give a cutting pressure to the cutter wheel 35 in perpendicular to the plane of the glass plate.

The cutter wheel 35 can be aligned with the rotating axial center of the cutting head 7, that is, the axial center of the shaft 31 of the bearing device 30 by the setting slide 37 and the cross slide 38, that is, by moving the respective adjusting screws 371 and 381, while the cutting trace can finely be adjusted by displacing the axial center. That is, the cutting trace can be enlarged or contracted.

Of course, the cutter wheel 35 undergoes the rotation control from the shaft 31 and is angularly controlled such that the cutting direction is always kept at the tangential direction relative to the cutting line (score-cutting line).

Figure 10:
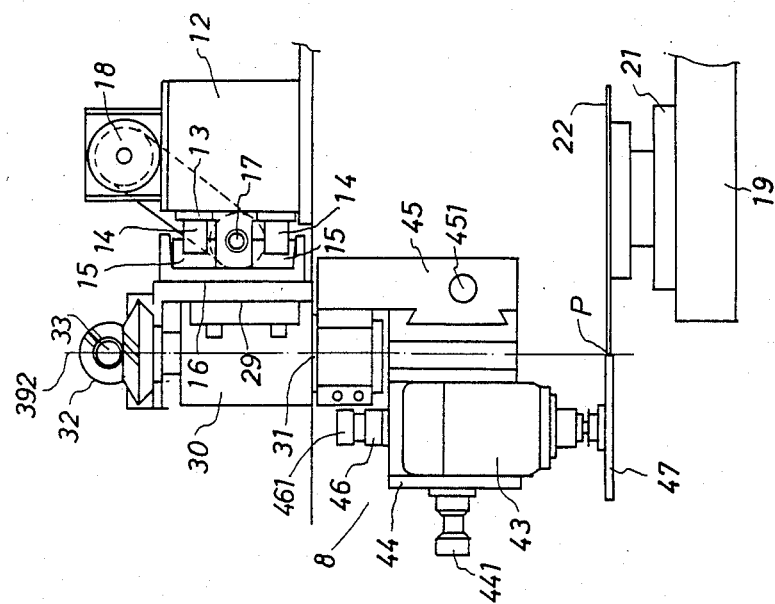
Figure 9:
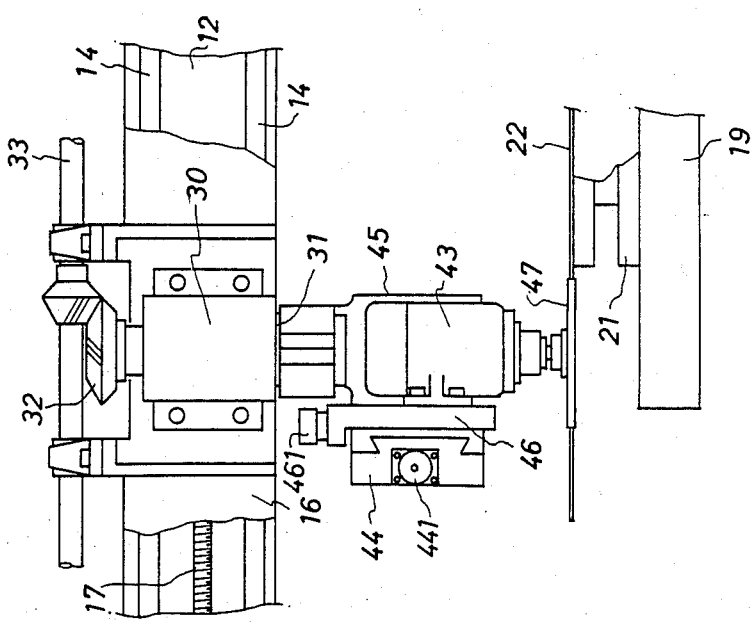

As shown in FIG. 9 and 10, the grinding head 8 comprises a spindle motor 43, a cut-adjusting slide 44 and a cross slide 45 for adjusting the mounting position of the spindle motor 43 in two directions crossing each other within a horizontal plane and a vertical slide 46 for adjusting the vertical position of the grinding wheel 47, and the grinding wheel 47 is attached to the shaft of the spindle motor 43.

The cut-adjusting slide 44 is moved for adjustment in one predetermined direction by turning a screw 441, while the cross slide 45 is moved for adjustment in the other direction in perpendicular to the direction described above by turning a screw 451, while the vertical slide 46 is moved for adjustment in the direction perpendicular to both of the directions by turning the screw 461.

Then, it is attached at the upper portion of the cross slide 45 to the shaft 31 of the bearing device 30 and the entire grinding head 8 is retained while being suspended by the shaft 31.

The grinding wheel 47 is so adapted that the circumferential end thereof (grinding face) is aligned with the axial center of the shaft 31 by adjusting the cut-adjusting slide 44 and the cross slide 45, that is, by turning the screw 441 and the screw 451 respectively. When the grinding point at the circumferential end of the grinding wheel 47 is aligned with the axial center for the shaft 31 in this way, the grinding point of the grinding wheel 47 and the cutter wheel 35 of the cutting head 7 draw moving traces substantially identical with each other.

Then, the finishing by grinding is carried out by projecting the grinding point at the circumferential end of the grinding wheel 47 beyond the axial center of the shaft 31 by adjusting the cut-adjusting slide 44 by turning the screw 441 (giving a cutting amount) thereby somewhat contracting the moving trace.

The grinding wheel 47 is also subjected to the angular control by the rotational control of the shaft 31 such that the grinding point at the circumferential end moves while always keeping a constant angle with respect to the edge line of the glass plate.

FIGS. 1, 2 through 5 and 7 show a glass conveying device 49.

The glass plate conveying device 49 is disposed above the work table 19 along with the cutting table 20 and the suction disk 21 for grinding.

The glass plate conveying device 49 has a feed screw frame 50 disposed to the trestles 11 and 11 on both sides of the machine base 10 in parallel with X-axis carriage 12, and a moving block 52 is disposed to parallel guide rails 51 and 51 disposed to the lower surface thereof such that the block 52 is moved being guided by means of slides 53 and 53 in parallel with the direction of X-axis.

The moving block 52 of the glass plate conveying device 49 is driven by a feed screw 80 disposed between two sets of the guide rails 51 and 51 and a feed screw drive motor 82 coupled to the feed screw 80 by way of a transmission means 81 such as a teethed belt. The feed screw drive motor 82 is driven under control based on the numerical information from a numerical control device. Accordingly, the transportation of the glass plate by the glass plate conveying device 49 is carried out accurately under numerical control as described later. Further, a transport frame 55 is attached to the lower surface of the moving block 52 by means of brackets 54 and 54. The transport frame 55 has such a length as extended from the feeder table 5 to the grinding station 2 and has suction pads 56 corresponding to each of the positions. That is, the suction pads 56 are situated above and corresponding to the feeder table 5, cutting table 20, suction disk 21 and cracking conveyor 73 described later respectively. These suction pads 56 are attached to the respective air cylinder devices 58 disposed to the transport frame 55 by means of the brackets 57.

The pad is mounted to the piston rod 59 of the air cylinder device 58, lowered by the extension of the piston rod 59 to attract the glass plate and then raise the glass plate 22 by the raising of the piston rod.

The glass plate 22 is transported in this state to the next position along with the movement of the transport frame 55 and the suction is released upon lowering the suction pad 56 again and then the glass plate 22 is transferred. Each of the air cylinder devices 58 is provided with an "anti-rotation" mechanism so that the suction pad 56 does not rotate upon vertical movement thereof.

Figure 4:
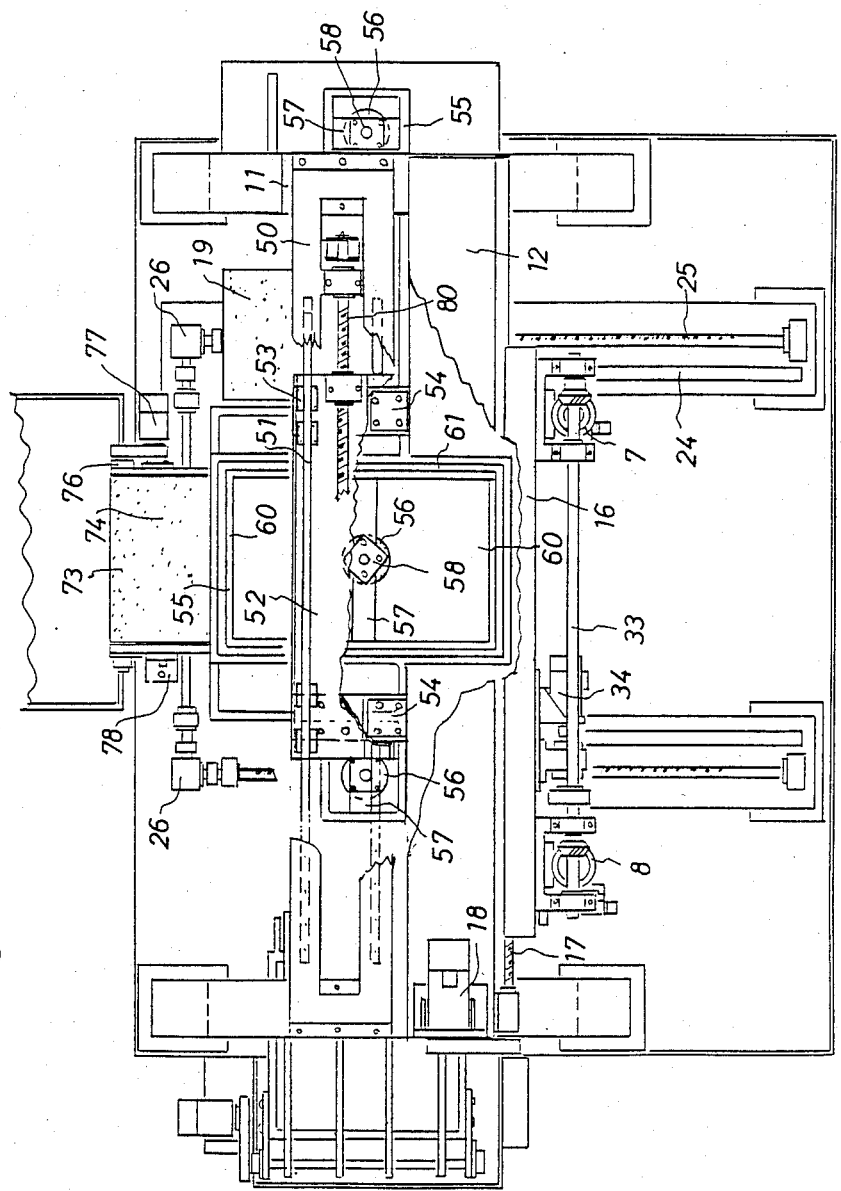
Figure 5:
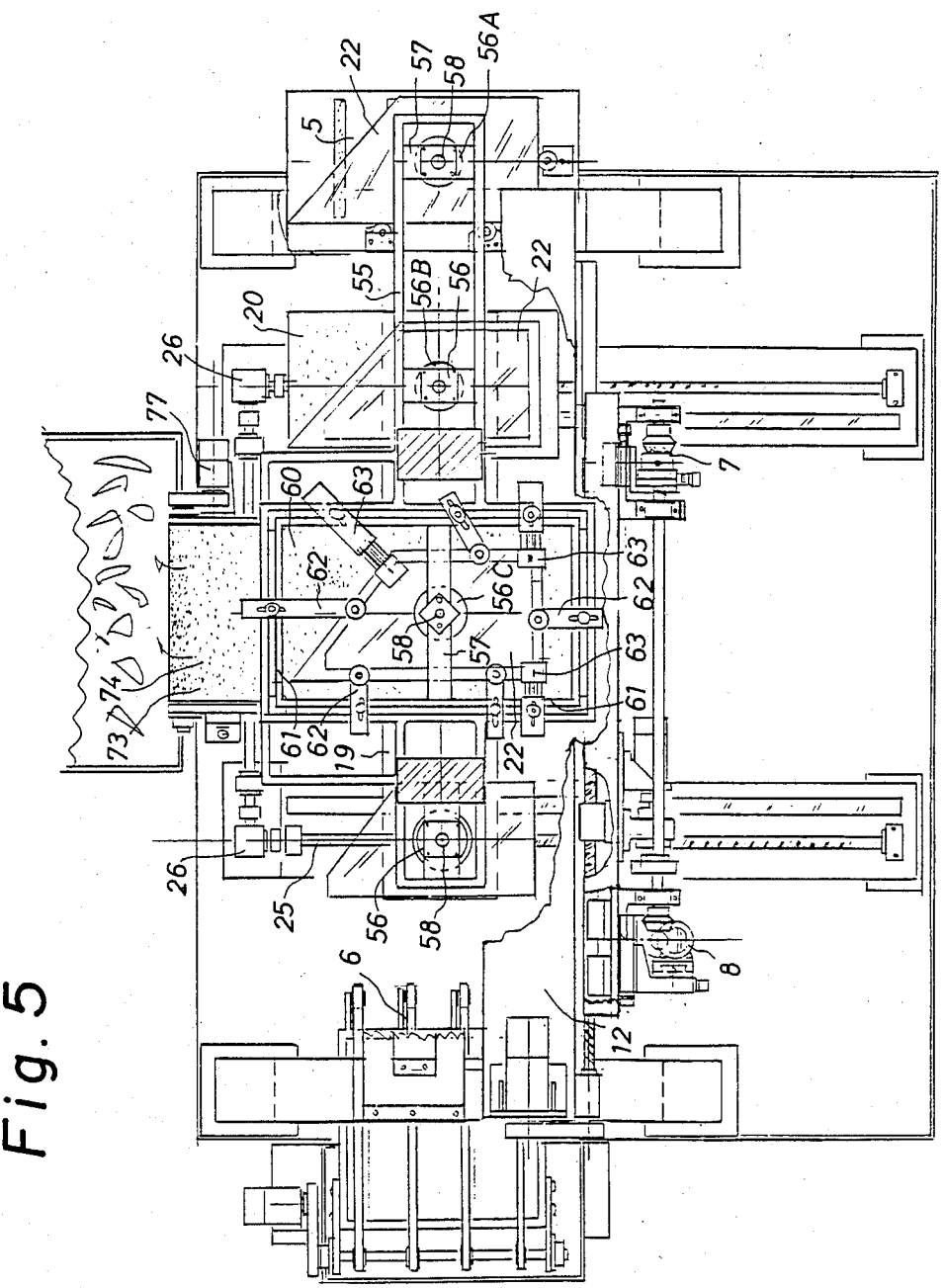

As shown in FIGS. 4 and 5, the transport frame 55 has a peripheral frame 60 which is disposed so as to surround the cracking station 3.

A plurality of pressing devices 62 and end cutter devices 63 are attached to the frame edge 61 of the pheripheral frame 60, being directed inwardly and downwardly.

Figure 13:
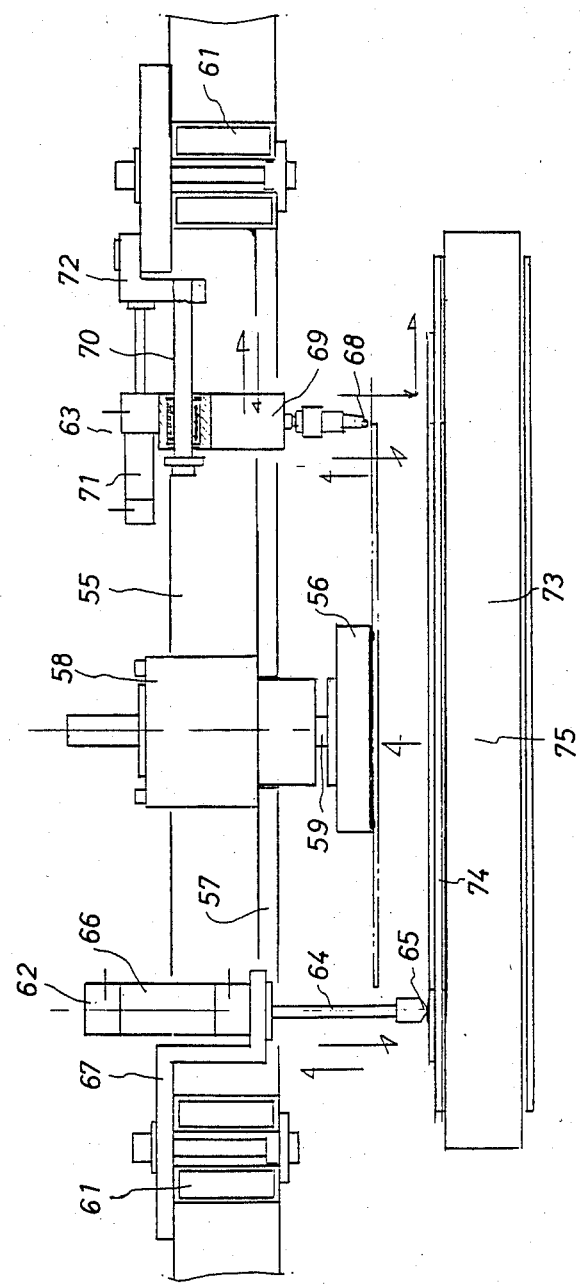

As shown in FIG. 13, the pressing device 62 comprises an air cylinder 66 having a piston rod 64 with a protrusion 65 being attached at the top end thereof and a bracket 67 to which the air cylinder 66 is disposed vertically. The air cylinder 66 is attached to the frame edge 61 by means of the bracket 67. The glass plate is cracked by striking the plate with the protrusion 65 when the piston rod 64 is extended.

The end cutter device 63 comprises a first air cylinder 69 having a piston rod with a cutter block 68 being attached at the top end thereof and moving the piston rod vertically in perpendicular to the glass plate, a guide shaft 70 for movably holding the first air cylinder 69 so as to be slidable in the lateral direction, a second air cylinder 71 mounted to the first air cylinder 69 for displacing the first air cylinder 69 and a bracket 72 for holding the guide shaft 70. The end cutter 63 is mounted by means of the bracket 72 to the frame edge 61.

Upon cutting the end of the glass plate by the end cutter device 63, the first air cylinder 69 is actuated at first to about the cutter block 68 against the glass plate and then the second air cylinder is actuated to run in the lateral direction in this state.

"End cutting" is applied to the unnecessary portion of the glass plate outside the score-cutting line formed by the cutting head 7.

After applying the end cutting by the end cutter device 63, the pressing device 62 is actuated to crack the glass plate.

The cracking station 3 includes a cracking conveyor 73 combined with the pressing device 62 and the end cutter device 63.

The cracking conveyor 73 is laid across and above the work table 19 between the cutting table 20 and the suction disk 21 for grinding of the work table 19.

The upper surface of the cracking conveyor 73 is arranged substantially flush with the upper surfaces of the cutting table 20 and the suction disk 21 arranged in adjacent therewith.

Further, the cracking conveyor 73 comprises a conveyor belt 74 running above and across the work table 19, a frame 75 serving also as a support plate for horizontally supporting the conveyor belt 74 from the inside, drums 76 and 76 supported on both ends of the supporting frame 75 by means of bearings for circulating the conveyor belt 74, and a drive motor 77 attached by means of a bracket to the supporting frame 75 for driving one of the drums 76 and 76. The cracking conveyor 73 is supported by means of brackets 78 and 78 to the machine base 10 on both sides of the supporting frame 75.

The area for the upper surface of the cracking conveyor is so defined that the entire surface of a glass plate 22 of the maximum size to be supplied to the machine can be supported entirely.

Cullets produced by the cracking are discharged out of the machine by driving the conveyor belt 74 and a glass plate supplied subsequently is received simultaneously on the fresh surface of the cleaned belt.

The operation of the fabrication machine according to this invention and the steps from the supply to the finishing of raw glass plates by the machine will now be described sequentially while referring to FIGS. 1, 5, 6 and 8.

Upon starting the fabrication machine, the cutter wheel 35, the grinding wheel 47, as well as the work table 19 and the glass plate conveying device 49 are respectively set to the original positions. The original position for the work table 19 situates just below the suction pad 56 of the glass conveying device 49, in which the center line for the suction pads 56 arranged in the forwarding direction of the glass plate 22 is aligned with the center line for the work table 9.

Further, the original position for the glass conveying device 49 is at a position where the transport frame 55 locates on the glass feeding side, that is, where the suction pad 56 is situated on the feeding table 5, as shown in FIG. 1.

Now when the respective stations locate at the original positions, raw glass plate 22 is at first placed on the glass feeder table 5 and the fabrication machine is started by pushing a machine start button. Then, the suction pad 56A is lowered to attract and raise the glass plate 22.

In this state, the transport frame 55 moves and, when the suction pad 56A reaches a predetermined position on the cutting table 19, the suction pad 56A is lowered and the vacuum suction is removed to release the raw glass plate 22 on the cutting table 20. The suction pad 56 is returned upwardly. As soon as the transport frame 55 starts the to returning movement to the original position, the cutting head 7, the grinding head 8 and the work table 19 start the movement under numerical control and the cutting work begins (score-cutting by the cutter wheel 35). When the cutting head 7, the grinding head 8 and the table 19 return to the original positions upon completion of the cutting work, the suction pad 56 is lowered to raise the glass plate 22 again, and the glass plate 22 after the cutting on the cutting table 20 is transported by the movement of the transport frame 55 to the cracking conveyor 73, while a next raw glass plates 22 is supplied from the feeder table 5 to the cutting table 20.

In the course where the raw glass plate 22 is being applied with cutting (score-cutting) on the cutting table 20, end cutting is at first applied to a predetermined position by the end cutter devices 63 disposed to predetermined positions. Then, the suction pad 56C is lowered to attract the glass plate 22, as well as the pressing devices 62 disposed at predetermined positions are actuated to crack and remove the unnecessary portion such as glass ends or the likes. Meanwhile, the suction pad 56C is ascended to raise the glass plate 22 cracked into a predetermined profile. In this state, the operation of the cracking station is stopped till the cutting work at the cutting station 1 is completed.

When the cutting work has been completed, the glass plate 22 in the cracking station 3 is transported to the suction disk 21 in the grinding station 2 by the operation of the glass conveying device 49, and a next glass plate finished with cutting is sent to the cracking station 3, while raw glass plate 22 is supplied to the cutting table 20. The cracked glass plate transported to the grinding station 2 is applied with the grinding in parallel with the cutting work, while the cracking operation is being carried out in the cracking station 3.

The operation in the grinding station 3 is of course interlocked completely with the operation in the cutting station 1.

The glass plate finished with the grinding at the grinding station 2 is transported onto the discharging conveyor 6 at the next operation cycle of the conveying device 49 and discharged out of the machine by the operation of the discharging conveyor 6.

In accordance with this invention, since the cutting and grinding are conducted in parallel by common control means, the number of working steps can significantly be reduced as compared with the prior art in which the operations are carried out by independent devices.

Further, since the cutting and grinding are carried out based on one identical numerical data, change of the kinds of articles can be coped with easily thereby making it suitable to the small lot production for various kinds of articles.

Further, since the automatic cracking is proceeded simultaneously in the cracking station 3 during the working operation in the cutting station 1 and the grinding station 2, a sufficient time is allowed for the cracking operation, by which reliable cracking operation can be carried out.

Furthermore, since the glass plate fabrication machine according to this invention comprises the cutting station 1, the cracking station 3 and the grinding station 2 and, moreover, the glass plate conveying device 49 disposed throughout the cutting station 1, the cracking station 3 and the grinding station 2, all of the steps from the supply of the raw plate glass to the discharging of the glass plates finished with the grinding can be conducted automatically and continuously with no manual operation at all.

The fabrication machine according to this invention is quite compact and space-saving and requires no largescale system for collectively controlling each of the devices as compared with a large scaled line in the prior art in which separate devices are coupled sequentially by means of conveyors. Furthermore, the machine is convenient for the change of the kinds of articles and thus suitable to the small lot production for wide variety of articles.

Explanation will be made to the another embodiment of this invention. In the drawings, are shown a table 101 moving linearly along with the feeding direction of a glass plate, a cross block 102 moving linearly in the direction crossing to the linear moving direction of the table 101, a grinding head 103 mounted to the cross block 102, and a cutter head 104 also mounted to the cross block 102.

The line connecting the grinding head 103 and the cutter head 104 is in parallel with the linear moving direction of the table 101.

A cracking device 105 is disposed above the table 101 on a machine base 106 by means of a support 164.

On the table 101, a glass plate fixing block 107 at a position corresponding to the grinding head 103 and a cutting table 108 at a position corresponding to the cutter head 104 are disposed respectively. 167 denotes a positioning device for the glass plate.

The table 101 are mounted on two slide rail devices 109 and 109 laid on the machine base 106 along the direction of feeding the glass plate and adapted to move linearly on slide rails 111 and 111 by being driven from a ball screw device 110 disposed between the slide rail devices 109 and 109.

The ball screw device 110 is connected to an X-axis servo motor 113 by means of a timing belt 112 and the X-axis servo motor 113 is connected to a numerical control device and put under the numerical control.

Slide nuts 114 are engaged with the slide rails 111 and the table 101 is secured to the upper surface of the nuts.

Ball screw nuts 115 are engaged with the ball screw 116 and secured at a portion thereof to the table 101.

The glass plate fixing block 107 disposed to the table 101 has a replaceable suction disk 170 for attracting to fix a glass plate 166 which is connected by way of vacuum hoses or the likes to a vacuum pump.

While on the other hand, the glass cutting table 108 also mounted on the table 101 is in a structure of a belt conveyor having a flat upper surface on which a glass plate is placed for cutting fabrication (score-cutting).

The belt 117 also serves to receive and externally discharge cullets produced at the cracking station.

The glass plate cutting table 108 having the foregoing function comprises a belt 117, a support plate 118 for supporting the plane of the belt 117 state from the inside, drums 119 and 119 for winding the belt 117 therearound and a motor device 120 for rotating the drum 119, and the cutting table is secured at its main body 121 to the table 101.

While on the other hand, the cross block 102 to which the grinding head 103 and the cutter head 104 are mounted is laid above the table 101 such that it moves linearly in the direction crossing to the linear moving direction of the table 101.

Specifically, the cross block is carried on slide rail devices 122 and 122 laid to stands 165 and 165 respectively erected at the rear and front ends of the machine base 106 and adapted to move linearly on slide rails 124 and 124 by ball screw devices 123 and 123 disposed on the side of the respective slide rail devices 122 and 122.

The cross block 102 is laid while being secured to slide nuts 125 and 125 of the slide rail devices 122 and 122 respectively.

Ball screw nuts 126 and 126 of the ball screw devices 123 and 123 are respectively secured at the front and rear portions of the cross block 102.

The ball screw devices 123 and 123 on the right and left are connected by means of gear boxes 127 and 127 to a line shaft 128, and the line shaft 128 is connected by way of a timing belt 129 or the like to a Y-axis servo motor 130. The Y-axis servo motor 130 is also connected to the numerical control device and driven under numerical control.

In the drawings, are also shown pillow blocks 131 and 131 for holding the line shaft 128 and bearing devices 132 and 132 for holding the ball screws from the machine base 106.

Figure 14:
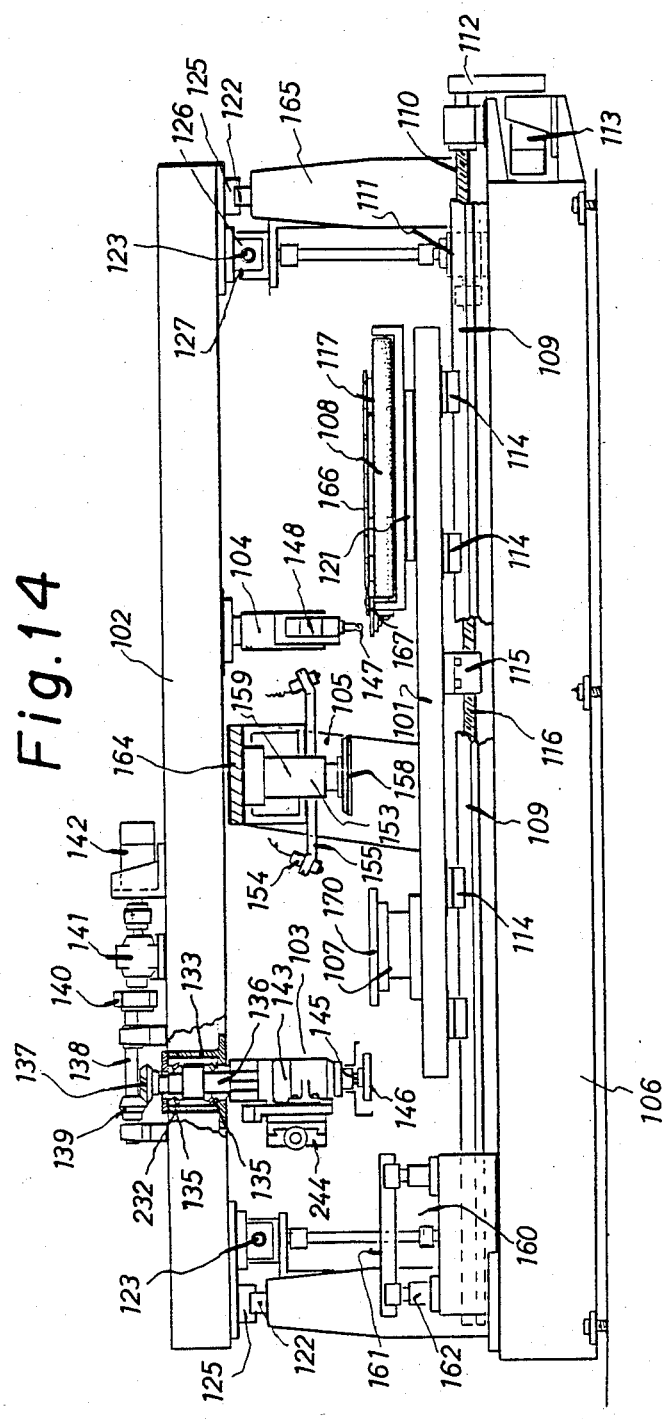
Figure 15:
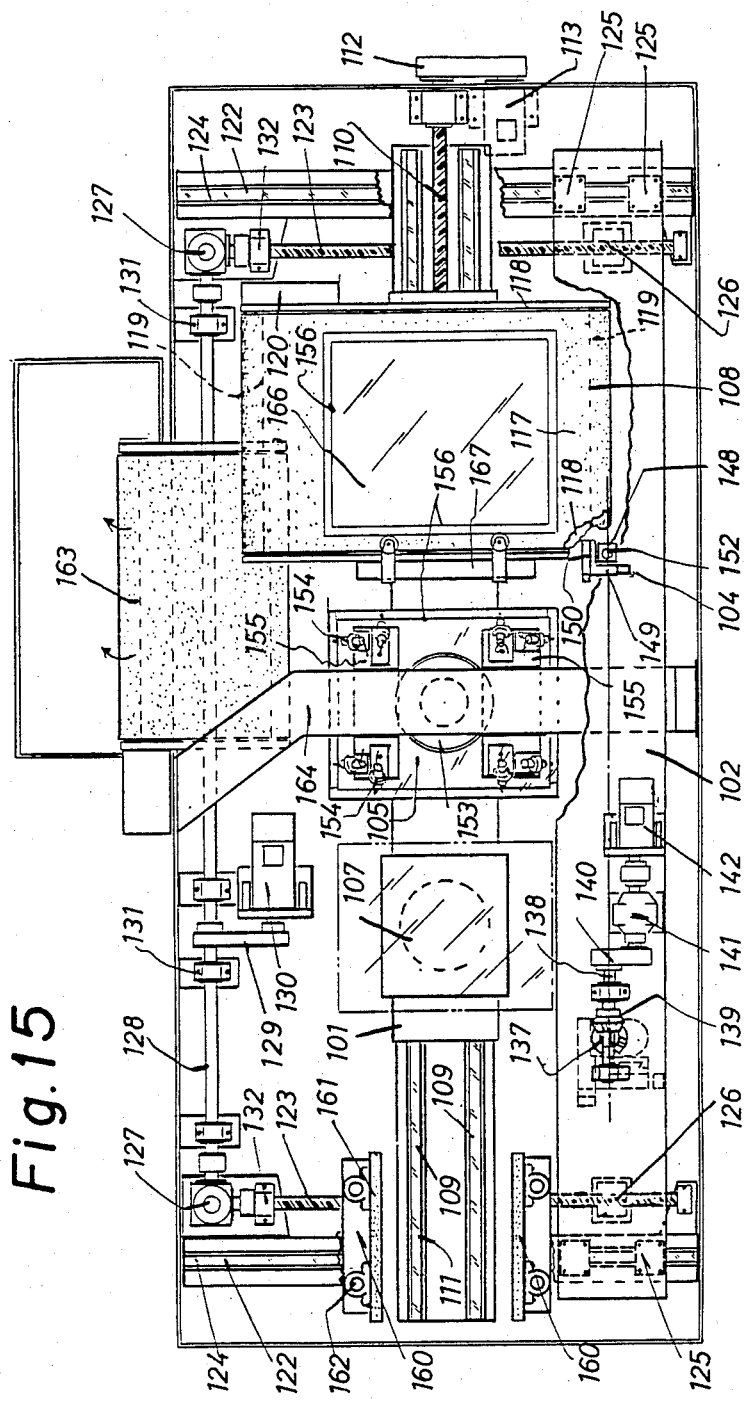

The grinding head 103 for grinding the edge of a glass plate is mounted by way of a rotary device 232 to the cross block 102. As shown in FIG. 14, the rotary device 232 comprises a housing 133 secured to the cross block 102 and a rotary shaft 136 assembled into the housing 133 by means of bearings 135 and 135. The grinding head 103 is secured to the lower end and a bevel gear 137 is secured at the upper end of the rotary shaft 136.

A bevel gear 139 secured to the shaft 138 held by a pillow block or the like is meshed with the bevel gear 137, and the shaft 138 is coupled by means of a timing belt 140 or the like to a speed retarder 141 and a Z-axis servo motor 142.

The Z-axis servo motor 142 is also connected to the numerical control device so as to rotate the grinding head 103 by way of the shaft, the bevel gear and the rotary device 232 under numerical control.

As shown in FIG. 14, the rotary device 232 is set to such a status in perpendicular to the linear moving direction of the table 101 and also to the linear moving direction of the cross block 102.

That is, the grinding head 103 is adapted to rotate around an axis vertical to the orthogonal X-Y plane (that is, the plane of the glass plate 166) defined with the table 101 and the cross block 102.

Figure 16:
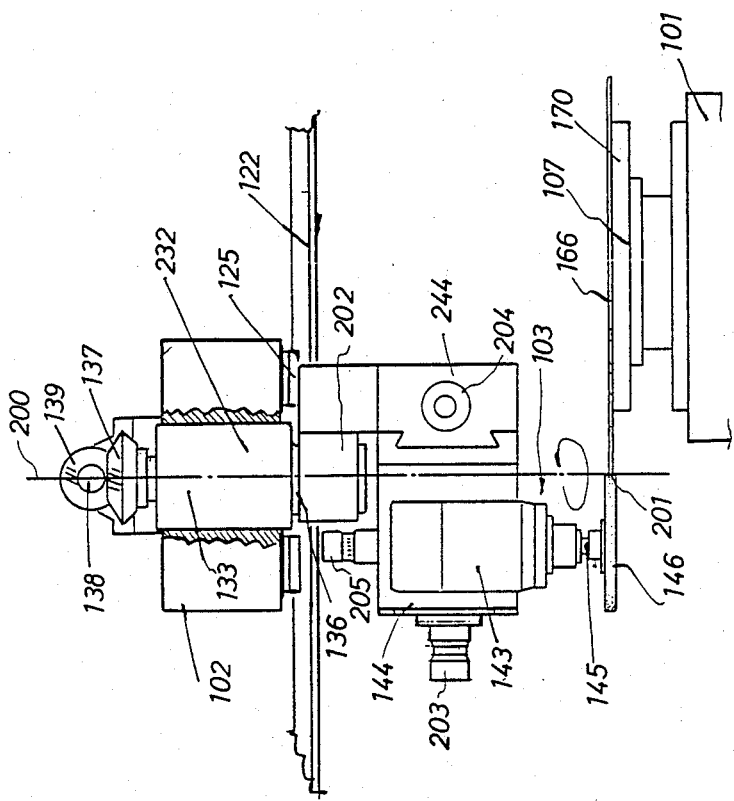

In addition, the axial center 200 for the center of rotation of the grinding head 103 is positioned passing through the contact (grinding point) 201 between the glass plate 166 and the grinding wheel (diamond wheel) 146 as shown in FIG. 16.

Accordingly, when the grinding head 103 rotates around the axial center 200, the grinding wheel 146 moves along the outer circumference of the glass plate 166 while rotating (swinging) around the contact with the glass plate 166, that is, around the point being ground.

Specifically, the grinding wheel 146 is so adapted to perform grinding while swinging conforming the shape of the glass plate 166 always keeping a constant angle relative to the currently varying outer circumferential shape of the glass plate.

The rotation of the grinding head 103 is of course performed under numerical control.

The grinding head 103 comprises a spindle motor 143 serving both as a spindle and a motor, as well as slides 144 and 244 attached with the spindle motor 143 for moving the spindle motor 143 for adjustment in two directions in perpendicular to each other (that is, X-Y direction). The head is attached at one end 202 of the slide 244 to the rotary shaft 136 so as to hold the entire grinding head 103. The slide 144 is moved by the screw 203 and the slide 244 is moved by a screw 204 for adjustment respectively.

Further, the spindle motor 143 is moved for adjustment by a screw 205 in the direction along with the axis 200. The spindle motor 143 is attached in a vertical status with the axial center of the rotary shaft 145 being in parallel with the rotating axis 200 relative to the glass plate 166. A disk type (pencil edge type) diamond wheel 146 is attached to the rotary shaft 145 of the spindle motor 143.

The cutter head 104 is disposed together with the grinding head 103 while being aligned with a line in parallel with the linear moving direction of the table 101.

The line connecting the center 205 for the cutter head 104 (point of contact between the cutter wheel 147 and the glass plate) and the rotating center 201 for the grinding head 103 (point of contact between the glass plate and the grinding wheel 146 : grinding point) is in parallel with the center line of the table (linear moving direction).

The original position on the Y-axis for the cutter head 104 is aligned with that for the grinding head 103.

The cutter head 104 comprises a cutter main body devive 148 having the cutter wheel 147, and X-Y slides 149 and 150 for moving to adjust the cutter main body device 148 in two directions perpendicular with each other and the cutter head is mounted to the cross block 102 by way of the slide 150. The X-Y slide 149 is adjusted by a screw 206, while the X-Y slide 150 is adjusted by a screw 207 respectively in the foregoing directions.

Figure 17:
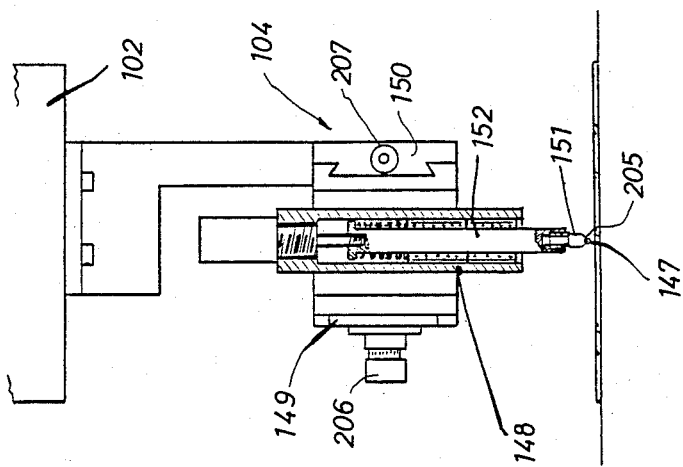

As shown in FIG. 17, the cutter main body device 148 comprises a cutter device 151 incorporated with the cutter wheel 147 and capable of swinging and rotating the cutter wheel 147 and a cutter elevating device 152 for vertically moving the cutter device 151 attached therewith. The cutter elevating device 152 is adapted as a springreturn type air cylinder. The cutter device 151 and thus the cutter wheel 147 are lowered upon supply of an air pressure and returned upwardly upon by the spring force releasing the air pressure.

The vertical movement of the cutter wheel 147 is carried out by the signal from the numerical control device.

The cracking device 105 is disposed between the grinding head 103 and the cutter head 104 and their center is aligned along the center line of the table 101 (along the linear moving direction).

As described above, the cracking device 105 is supported by way of the support 107 on the machine base 106 and is quite free from the cross block 102.

Now, as shown in FIG. 14, the cracking device 105 has at the center thereof a raising device 153 for attracting the glass plate 166 to raise the plate to a required height, around which are disposed a plurality of air cylinders for cracking the glass plate 166 (pushcracking), or frame devices 154 for jetting out frames.

The cracking device 105 shown in this embodiment is constituted as a frame type device for applying frames to the glass plate.

As shown in the drawings, each of the frame devices 154 disposed to the outer side is held to the support 164 by way of a bracket 155 and set such that the jetted frames are applied to the portion of the glass plate 166 outside from the score-cutting line 156 having been applied to the glass plate 166, when the glass plate 166 is raised so that unnecessary portion of the plate is cracked along the scorecutting line and fallen.

Propane gas is usually employed for jetting out the frames.

The cracking device 105 may of course be adapted in other ways, for example, cracking may be carried out by using a plurality of air cylinders or may be carried out by gripping and bending by an air cylinder type hand.

The raising device 153 for the glass plate comprises a suction disk 158 for attracting the glass plate and a cylinder device 159 for raising the suction disk 158, and the glass plate 166 is secured by the cylinder device 159 and the support 107.

The suction disk 158 is connected to a vacuum pump, while the cylinder device 159 operates the suction disk 158 vertically by means of air pressure.

The vertical movement of the cylinder device 159, etc. is conducted by the signal from the numerical control device.

Elevating blocks 160 and 160 for receiving the glass plate after grinding are disposed to the rear portion of the glass plate fabrication machine. The elevating blocks 160 and 160 comprise receiving blocks 161 and 161 disposed on both sides of the coming table 101 for receiving the glass plate 166 and an elevating device 162 for elevating the receiving block 161. The elevating device 162 has a structure of an air cylinder or a screw type jack supported on the machine base 106.

In the case of the screw type jack, it is connected to the motor for automatical elevation. At the completion of the grinding cycle, when the table 101 moves backwardly and the glass plate fixing block 107 reaches the position to the elevating block 160, the receiving blocks 161 and 161 on both sides are elevated simultaneously with the release of the suction force to the glass plate fixing block 107 to receive the glass plate 166 and, thereafter, they are lowered again when the glass plate fixing block 107 is aparted by the forward movement of the table 101.

The glass plate fabrication machine according to this invention is put under numerical control by the numerical control device and operated by the signal therefrom. The operation of the machine will now be described.

At first, as shown in FIG. 18, when the table 101 reaches the forward end, a glass plate 166 is placed on the cutting table 108 and set to a predetermined position. Then, the cutter head 104 advances above the glass plate 166 by the simultaneous 3-axis control for the table 101, the cross block 102 and the grinding head 103 and applies a score-cutting 156 in a required shape to the glass plate 166 by the lowering of the cutter wheel 147. Simultaneously with the completion of the score-cutting, the cutter wheel 147 is elevated and the cutter head 104 is aparted from the cutting table 108 and moved to the original position by the movement of the cross block 102.

While on the other hand, the table 101 moves backwardly and, when the cutting table 108 reaches a position corresponding to the cracking device 105, the raising device 153 pulls up the glass plate 166 and, at the same time, cracks the glass plate along the score-cutting line 156 (refer to FIG. 20).

Cracked cullets left on the cutting table 108 are discharged to the external conveyor 163 along with the driving of the belt 117 of the cutting table 108, during returning movement of the table 101 and the conveyor belt exposed with the fresh surface reaches the forward end and receives the raw glass plate on the exposed surface (refer to FIG. 18).

In this case, the glass plate fixing block 107 during the grinding work reaches a position corresponding to the cracking device 105 and the raising device is lowered to transfer the cracked glass plate 166.

Figure 19:
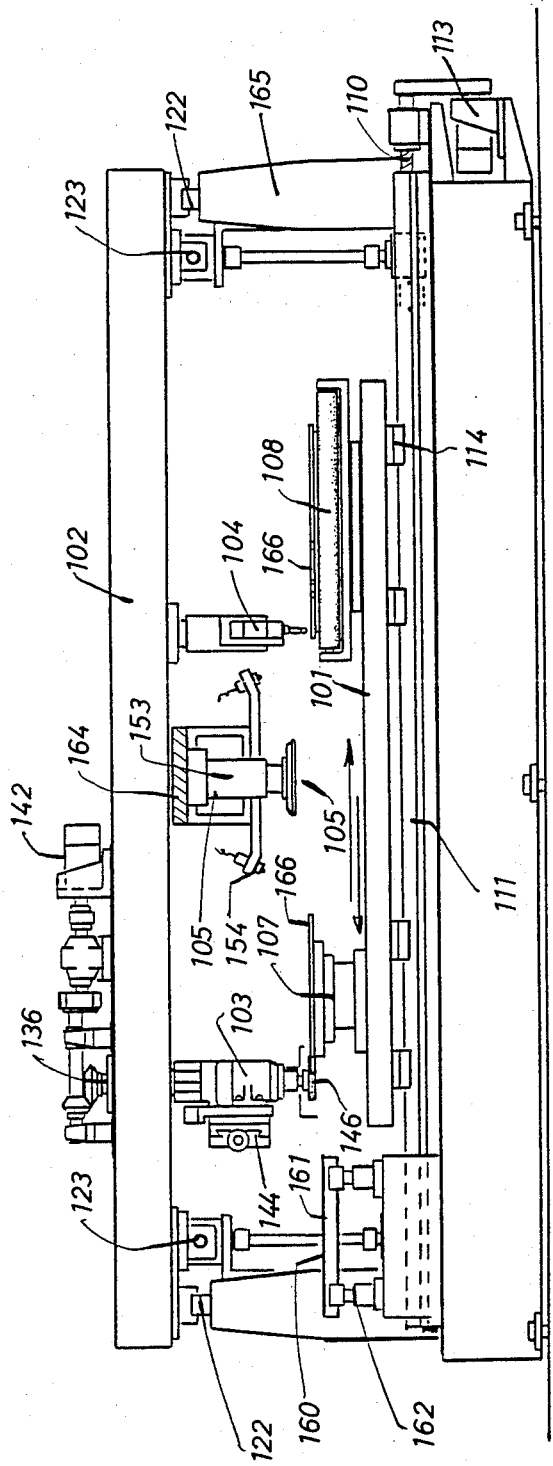

As shown in FIG. 19, the glass plate fixing block 107 having received the glass plate 166 returns to the grinding station by the movement of the table 101 and, simultaneously, the grinding head 103 approaches to carry out grinding for the edge of the glass plate. In the course where the grinding head 103 is conducting the grinding work while tracking the outer circumference of the glass plate under numerical control, the cutter head 104 also proceeds on the identical trace and is applying the score-cutting 156 to the glass plate 166.

At the completion of the grinding work, the grinding head 103 aparts from the glass plate 166 and moves to the original position. In this case, the table 101 moves backwardly for transferring the glass plate 166 finished with the grinding on the glass plate fixing block 107 and the glass plate 166 applied with the score-cutting line 166 on the cutting table 108 to the elevating blocks 160 and 160 and to the cracking device 105 respectively. The table 101 is proceeded under numerical control.

When the glass plate fixing block 107 reaches the elevating blocks 160 and 160, the elevating blocks 160 and 160 are again elevated as shown in FIG. 20 and receive the glass plate 166 finished with the grinding. Meanwhile the cutting table 108 also reaches the position corresponding to the cracking device 105 in which the glass plate raising device 153 raises the glass plate 166 and conducts cracking along the score-cutting line.

The table 101 having thus transferred the glass plates 166 and 166 returns to the forward end for receiving a raw glass plate to be fabricated. Then, it receives the new glass plate and conducts the fabrication again under the numerical control.

As has been described above by the glass plate fabrication machine according to this invention: (1) since the grinding head 103 serving to the grinding for the edge of a glass plate tracks the outer circumference of the glass plate with a predetermined angle under the simultaneous 3-axis numerical control comprising the X-Y axis control by the table 101 and the cross block 102, as well as the rotation control which is conducted vertical to the glass plate and around the axis passing through the contact between the glass plate and the grinding wheel (grinding point) 201, the grinding point can be aligned with the score-cutting line formed by the cutter head, whereby since the X-Y axis control required for controlling the cutter head is at least identical with that for the grinding head 103, integral control for their movement is possible. Therefore, a compact machine capable of conducting the grinding and the glass plate cutting simultaneously in which the numerical control is performed by an identical numerical control device can be attained. (2) Further, since the cracking device 105 is provided, the machine can conduct fabrication from the glass plate cutting through the cracking to the grinding in a continuous step. (3) Since the glass plates to be fabricated are sequentially fed by the table 101 under numerical control, the positioning at the cracking station and the grinding station is no more necessary making it possible to render the machine structure simple and obtain an accurate finishing. (4) Since the machine can perform from the cutting through the cracking to the grinding and can operate under numerical control for all of the fabrication step, the kind of articles to be fabricated can be changed with ease.

What is claimed as new and desired to be secured by Letters Patent of the United States is:

1. A glass plate fabrication machine comprising:
   a cutting station for forming a score-cutting line to a raw glass plate for cutting said plate,
   a cracking station for automatically cracking said raw glass plate along with the cutting line,
   a grinding station for grinding an edge of the cracked glass plate,
   a glass plate conveying device for conveying said glass plate sequentially through the cutting station, the cracking station and the grinding station, and
   control means connected to said cutting station and said grinding station respectively for controlling each of them in common,
   and connected to the cracking station so that said cracking station conducts relevant operation during interlocking operations of said cutting station and said grinding station.

* * * * *